(12) United States Patent
Hammond

(10) Patent No.: US 6,599,948 B1
(45) Date of Patent: Jul. 29, 2003

(54) FOAM CONTROL

(75) Inventor: Peter Hammond, Manchester (GB)

(73) Assignee: The Victoria University of Manchester, Manchester (GB)

(*) Notice: Subject to any disclaimer, the term of this patent is extended or adjusted under 35 U.S.C. 154(b) by 0 days.

(21) Appl. No.: 09/763,323

(22) PCT Filed: Aug. 12, 1999

(86) PCT No.: PCT/GB99/02649

§ 371 (c)(1),
(2), (4) Date: May 29, 2001

(87) PCT Pub. No.: WO00/10679

PCT Pub. Date: Mar. 2, 2000

(30) Foreign Application Priority Data

Aug. 21, 1998 (GB) .............................................. 9818179

(51) Int. Cl.⁷ ............................................... B01D 19/02
(52) U.S. Cl. .......................... 516/115; 95/242; 96/176
(58) Field of Search ........................... 516/115; 95/242; 96/176

(56) References Cited

U.S. PATENT DOCUMENTS 5,066,291 A * 11/1991 Stewart ......................... 606/3
5,643,252 A * 7/1997 Waner et al. ................. 606/9

FOREIGN PATENT DOCUMENTS

| DE | 43 09 166 | 9/1994 |
| JP | 63-252509 | * 10/1988 |
| SU | 1 095 934 | 6/1984 |

OTHER PUBLICATIONS

Derwent Abstracts on East, week 198848, London: Derwent Publications, Ltd., AN 1988–341236, JP 63252509 A (Mitsubishi Heavy Ind Ltd) abstract.*

Derwent Abstracts on East, week 198502, London: Derwent Publications, Ltd., AN 1985–011081, SU 1095934 A (Moscow Chem Equip) abstract.*

Patent Abstracts of Japan, vol. 013, No. 061, Feb. 10, 1989 and JP 63 252509, Oct. 19, 1988.

Patent Abstracts of Japan, vol. 012, No. 344, Sep. 16, 1988 and JP 63 104620, May 10, 1988.

* cited by examiner

Primary Examiner—Daniel S. Metzmaier
(74) Attorney, Agent, or Firm—Nixon & Vanderhye P.C.

(57) ABSTRACT

Use of a foam control laser having a wavelength corresponding to a mode specific peak of the absorption spectrum of a liquid constituent of the form greatly increases the efficiency of foam control.

11 Claims, 1 Drawing Sheet

FOAM CONTROL

BACKGROUND OF THE INVENTION

1. Field of the Invention

The present invention relates to an apparatus and method for controlling foam, particularly water-based foam.

2. Related Art

Industrial production processes often result in the generation of significant volumes of foam which obstructs the production process or subsequent transportation and storage of a produced material. Various proposals have been made for reducing the volume of foam generated or destroying foam after it has been generated. It is known for example to add chemicals to a foam so as to cause it to collapse. In some industrial processes such an approach is effective but often it is inappropriate to add chemicals to a foam, for example when that foam is produced as part of the production process of a food, drug or beverage. Mechanical devices for destroying foam have also been proposed, for example cyclone foam breakers. In addition it has been proposed to expose a foam to an ultrasonic beam and irradiate a foam with radiation.

In one known foam irradiation proposal, described in U.S. Pat. No. 1095934, foam which is generated during microorganism synthesis is destroyed by exposing the foam to laser radiation at a wavelength corresponding to the spectrum of absorption of a film of the liquid contained in the foam. In another proposal described in Finnish patent specification no. FI 77788, reference is made to destroying foam by using a laser beam to cause "local heating and rupture" of the bubbles making up the foam. A carbon dioxide laser source is used having an operating wavelength of 10600 nm, at which wavelength water absorption is relatively high. In a further proposal described in Japanese patent specification no. JP 63 104620, a carbon dioxide laser is used to destroy foam on beer, foam destruction in a matter of seconds being claimed.

All the above proposals were first made in the 1980's but do not appear to have resulted in any practical devices based on the irradiation of foam with a laser. It is probable that this failure to exploit the initial proposals results from an understanding, that foam destruction with lasers relied upon absorption effects that result in heating of the foam, thus requiring relatively high power inputs and risking chemical modification of the foam.

Lasers based on the Erbium ion are known to operate at around 3000 nm which corresponds to a peak in the energy absorption spectrum for water also centred at approximately 3000 nm. For example, the Erbium:YAG laser operates at 2940 nm, and the Erbium:YSGG laser at 2970 nm. Absorption at around 3000 nm is approximately five times greater than at the carbon dioxide laser wavelength of 10600 nm, but nevertheless if the mechanism underlying the destruction of foam by lasers operating at around 3000 nm and 10600 nm was the same, using an Er based laser would not be expected to produce a dramatic improvement in performance as compared with that to be expected with a carbon dioxide laser.

BRIEF SUMMARY OF THE INVENTION

It is an object of the present invention to provide an improved laser radiation foam control apparatus and method.

According to the present invention, there is provided a foam control apparatus comprising means for directing a laser beam into a vessel adapted to receive a body of foam to be controlled, wherein the laser has a wavelength selected to correspond to a mode specific peak of the absorption spectrum of a liquid constituent of the foam. Preferably, the laser generates a pulsed output and the pulse length is selected to match the thermal and mechanical properties of the foam such that energy is transferred to the foam sufficiently rapidly to disrupt the molecular structure of the foam.

The invention is based on a consideration of mechanisms resulting in foam destruction in the case of water-based foam, that is foam in which bubbles are formed by films which are primarily of water. In the water molecule, the H—O—H structure is bonded such that the angle between the two O—H bonds is approximately 105°. Different modes of vibration exist for the molecule. In the gas phase the lowest energy vibration is a symmetric bending mode with a vibrational energy spacing of 0.1915 eV (6474 nm) and this probably causes the peak in the liquid water absorption spectrum around 6000 nm, Two stretching modes also exist, one symmetric and one asymmetric at energies of 0.4527 eV(2739 mn) and 0.4656 eV(2663 mn) in the gas phase respectively, and these probably result in the peak around 3000 nm in the liquid phase.

It is believed that an Erbium-based laser such as the Er:YAG laser pumps the asymmetric stretch mode of the molecule. It is probably the case that carbon dioxide laser absorption proceeds through rotational transitions that essentially heat the water molecules and hence the liquid. Thus, it is believed that exciting the asymmetric stretch mode of a water molecule with for example Er:YAG laser radiation injects an energy per photon that is about seventeen times larger than thermal energies and causes the O—H bonds to vibrate. Each water molecule can form hydrogen bonds with up to four other water molecules in a tetrahedral structure. Thus this vibrational motion created in the laser excited molecule very effectively disturbs the (two) hydrogen bonds between the H atoms in the excited molecule and the adjacent molecules (where at the corners of the adjacent tetrahedrons there is a high probability of electron density). Thus excitation of O—H bonds in one molecule causes breakage of the hydrogen bonds with nearby molecules. During laser irradiation, any molecules in a spatially localised region are excited, causing many hydrogen bonds to break, and so damaging the structural integrity of the liquid film of the foam bubble. A pulse of duration 0.25 ms for example can have a relatively low beam energy and yet deliver energy to the bubble at a rate which disrupts the molecular structure rather than simply heating the bubble wall. The destabilisation caused is amplified by the internal pressure of the bubble, causing the bubble to rupture before the hydrogen bonds can reform. In contrast, excitation by a carbon dioxide laser would cause an injection of energy per photon that is approximately five times greater than thermal (approximately one third less than for an Erbium-based laser) but the injection is not mode specific and causes bond breakage in a thermal manner. Thus although the absorption coefficient is only five times larger, the actual bubble bursting capability for 2940 nm radiation or other wavelengths close to 3000 nm is vastly superior to 10600 nm radiation because it is mode specific and leads to rapid structural collapse of the film. This very effectively bursts foam bubbles with an efficiency that is substantially greater than the factor five indicated by the relative absorption coefficients between the two laser wavelengths.

In summary, the invention is based on the realisation that the efficiency of foam destruction in comparing the a $CO_2$ laser with a laser operating at a mode specific wavelength will not mirror the ratio of absorption coefficients because the structural impact of the two wavelengths on a thin film in tension is different because of the mode specific nature of the Erbium-based laser excitation as compared with the rotational envelope "thermal" heating effect of the carbon dioxide laser.

Preferably if the foam to be destroyed is water-based, the laser is an Erbium-based laser such as an Erbium:YAG laser. The laser is preferably operated with a pulse width of 0.25 ms, that is with a pulse length which matches the thermal and mechanical properties of the bubble so as to transfer energy to the bubble at a rate which optimises the bubble damaging process. Means may be provided for spatially scanning or shaping an output beam of the laser so as to maximise the volume of foam exposed to the laser beam.

The invention also provides a method for controlling foam, wherein a laser beam is directed into a vessel containing the foam to be controlled, the laser having a wavelength selected to correspond to a mode specific peak of the absorption spectrum of a liquid constituent of the foam.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

Figure 1:
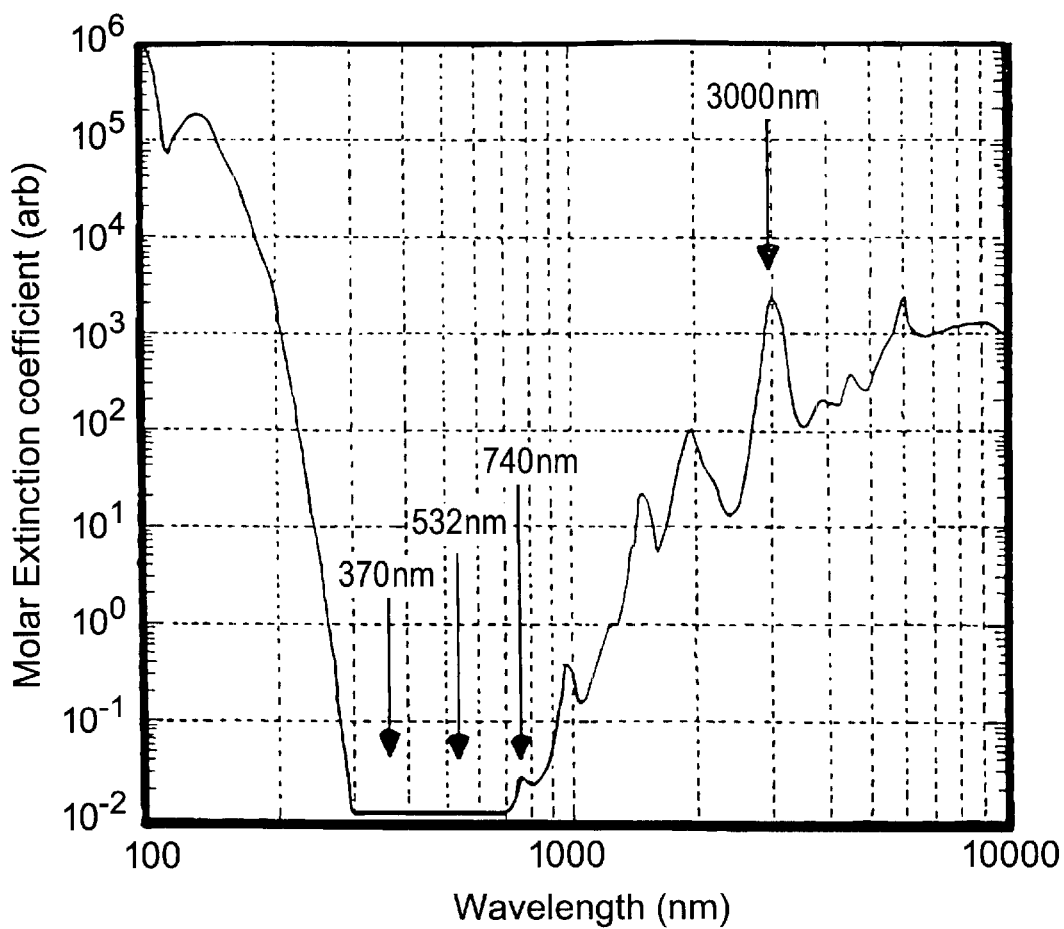
FIG. 1 is a graph representing the absorption spectrum of water molecules as a function of wavelength.

Referring to FIG. 1, the vertical axis represents the molar extinction coefficient (equivalent to an absorption coefficient) and the horizontal axis wavelength in nanometers. The coefficient is plotted on a logarithmic scale and thus covers the range from $10^{-2}$ to $10^6$. It will be seen that absorption in the visible light wavelength is very low, is very high at low wavelengths corresponding to the ultraviolet wavelength region, and increases rapidly with wavelength above the visible region, a substantial peak arising at a wavelength of about 3000 nm within the far infrared region of the spectrum.

Experiments have been conducted to assess the ability of laser beams to destroy foam using laser beams having wavelengths of 370, 532 and 740 nm respectively. These three wavelengths are shown on FIG. 1 and it will be seen that two of them are in positions in the spectrum where there is very little absorption by water molecules whereas the third (740 nm) corresponds to a region of the spectrum where there is some absorption but still far less than that to be expected in the ultraviolet and far infrared regions. The 370 nm laser source was of low power and no significant modification to an experimental body of foam could be detected. The laser output beam was scattered to a substantial extent. The 532 nm source was of high power (approximately peak power for a 10 ns pulse of 1000 kilowatts) and some foam destruction was noted but only when the beam was directed vertically downwards through the foam onto a glass foam support plate. It is believed that the foam destruction resulted from heating of the surface on which the foam was supported rather than direct interaction between the foam and the laser beam. The 740 nm source was found to be capable of modifying the structure of the foam but at a relatively slow rate despite the use of a relatively high powered beam (approximate peak power for 10 ns pulse of 85 kilowatts with a 2.0 mm² rectangular beam). Foam destruction appeared to be partly as a result of direct interaction between the beam and the foam and partly as a result of heating of a surface on which the foam was supported.

A further experiment was then conducted using an Erbium:YAG laser operating at a wavelength of 2940 nm since this radiation lay near the strong water absorbing peak at 3000 nm as shown in FIG. 1. Each pulse of radiation delivered approximately 400 mJ energy in a pulse of duration 0.25 ms. The diameter of the beam was 4 mm. The laser was single pulsed so that the effect of single pulses could be observed. Each individual pulse cut a cylinder 4 mm in diameter through the exposed body of foam. To the naked eye, it appeared as though a cylinder of bubbles simply disappeared instantaneously, although the actual destruction time scale is 0.25 ms.

Thus with a beam power of approximately 1 Watt foam can be destroyed very efficiently. With such a low power beam, there will be no significant heating of either the foam or its immediate environment as any part of the beam penetrating beyond the foam would be absorbed at or immediately adjacent to the surface of any structure exposed to the beam and therefore the beam could not deliver a significant input of energy.

Referring again to FIG. 1, the operating wavelength of the Erbium:YAG laser is indicated. It will be seen that the wavelength is very close to a large peak in the absorption spectrum of water. As described above however, the efficiency of foam destruction is a function both of absorption and the mechanism which contributes to a relatively high absorption, in particular the structural damage resulting from the mode specific interaction between the laser beam and the water molecules in the foam bubbles. It is believed that foams made up from bubbles which are not primarily water-based may be efficiently destroyed by selecting a laser wavelength matched to the molecular structure of the target foam so as to maximise mode specific absorption. For example, with water-based foams a mode specific interaction may occur at approximately 6000 nm if a laser source with such a wavelength is available.

Figure 2:
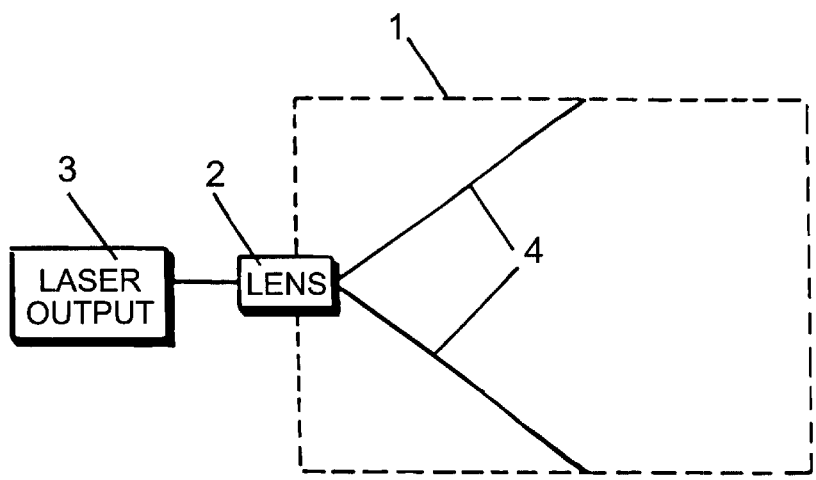
FIG. 2 is a schematic illustration of an apparatus in accordance with the present invention.

Referring now to FIG. 2, this schematically illustrates an embodiment of the present invention. A foam containing vessel represented by broken line 1 has mounted within it a lens system 2 which scans the single beam output 3 of an Erbium:YAG laser across a fan-shaped beam path 4. In this example, the beam path will be scanned in the horizontal direction and positioned so as to cut across the vessel at a height above which it is desired to prevent the establishment of a body of foam. In alternative arrangements, the beam could be directed downwards and shaped or scanned so as to achieve the required coverage. The beam could be diverged into a conical shape, or diverged into a fan-shape and then scanned across an area of interest. Experiments with some foams indicate that superior foam destruction is achieved by horizontal scanning of the laser beam as opposed to vertically downward scanning. This is because with certain types of foam the underlying foam is strong enough to support the liquid residue of burst bubbles and that residue shields the supporting foam from a vertically downwards directed laser beam. In contrast, a horizontal laser beam cuts into a vertical foam surface from which residual liquid flows away under the influence of gravity.

The vessel 1 of FIG. 2 could be for example a fermentation tank in a brewery with the lens system 2 located a short distance above the maximum level of liquid within the tank. Any foam formed in the vessel which is directly irradiated by the scanned beam 4 will be rapidly destroyed. In the case of a horizontally scanned beam, any foam initially located above the level of the beam path will fall vertically downwards into the beam as the foam beneath it is destroyed by the beam. Thus a very effective means for destroying foam within the vessel 1 is provided.

It will be appreciated that various optical devices can be provided to ensure substantially all of an area of interest is efficiently irradiated. For example the output of the lens system 2 may be located close to the vessel wall and arranged to scan a beam of radiation across a beam path extending approximately 180° in the horizontal direction.

What is claimed is:

1. A foam control apparatus comprising means for directing a laser beam into a vessel adapted to receive a body of water-based foam to be controlled, the laser has a wavelength selected to correspond to a mode specific peak of the absorption spectrum of a liquid constituent of the foam, wherein the laser is an Erbium-based laser the wavelength of which is about 3000 nm.

2. A foam control apparatus according to claim 1, wherein the laser generates a pulsed output and the pulse length is selected to match the thermal and mechanical properties of the foam such that energy is transferred to the foam sufficiently rapidly to disrupt the molecular structure of the foam.

3. A foam control apparatus according to claim 2, wherein the laser is arranged to produce pulses of 0.25 ms pulse length.

4. A foam control apparatus according to claim 1, wherein the laser is an Erbium: YAG laser, the wavelength of which is 2940 nm.

5. A foam control apparatus comprising means for directing a laser beam into a vessel adapted to receive a body of foam to be controlled, the laser having a wavelength selected to correspond to a mode specific peak of the absorption spectrum of a liquid constituent of the foam, and means for spatially scanning or shaping the laser beam to expand the horizontal extend of the beam across the vessel.

6. A method for controlling water-based foam, wherein a laser beam is directed into a vessel containing the foam to be controlled, the laser having a wavelength selected to correspond to a mode specific peak of the absorption spectrum of a liquid constituent of the foam, the laser being an Erbium-based laser having a wavelength of about 3000 nm.

7. A method for controlling water-based foam formed by bubbles of liquid having at least one bond between molecules of the liquid, said method comprising:
generating a laser output including a first wavelength which corresponds to a mode specific peak of an absorption spectrum of the liquid having a relative absorption that is greater than that for another second wavelength;
directing said laser output through said foam so as to excite molecular vibrational motion that disturbs an inter-molecular bond within an inter-molecular liquid film structure at least partially supporting said foam bubbles thereby providing a degree of foam control that is greater than that provided at said another wavelength by an amount greater than the difference in the absorption spectrum for said first and second wavelengths, wherein the laser is an Erbium-based laser, the wavelength of which is about 3000 nm.

8. A method as in claim 7 wherein the laser generates a pulsed output and the pulse length is selected to match the thermal and mechanical properties of the foam such that energy is transferred to the foam sufficiently rapidly to disrupt the molecular structure of the foam.

9. A method as in claim 8 wherein the laser is arranged to produce pulses of at least about 0.25 ms pulse length.

10. A method as in claim 7 wherein a laser beam is directed into a vessel containing the foam to be controlled.

11. A method for controlling foam formed by bubbles of liquid having at least one bond between molecules of the liquid, said method comprising:
generating a laser output including a first wavelength which corresponds to a mode specific peak of an absorption spectrum of the liquid having a relative adsorption that is greater than that for another second wavelength;
directing said laser output through said foam so as to excite molecular vibrational motion that disturbs an inter-molecular bond within an inter-molecular liquid film structure at least partially supporting said foam bubbles thereby providing a degree of foam control that is greater than that provided at said another wavelength by an amount greater than the difference in the absorpion spectrum for said first and second wavelength, wherein said laser output is spatially scanned or shaped to expand the horizontal extent of an output laser beam across a vessel containing a body foam to be controlled.

* * * * *